(12) United States Patent
Ghatage et al.

(10) Patent No.: US 10,332,109 B2
(45) Date of Patent: Jun. 25, 2019

(54) DATA RECONCILIATION

(71) Applicant: Accenture Global Services Limited, Dublin (IE)

(72) Inventors: Prakash Ghatage, Bangalore (IN); Naveen Kumar Thangaraj, Salem (IN); Sebastian Fernandes, Karnataka (IN); Sanjay Podder, Santiago del Estero (IN)

(73) Assignee: Accenture Global Services Limited, Dublin (IE)

( * ) Notice: Subject to any disclaimer, the term of this patent is extended or adjusted under 35 U.S.C. 154(b) by 791 days.

(21) Appl. No.: 14/922,487

(22) Filed: Oct. 26, 2015

(65) Prior Publication Data

US 2017/0039553 A1 Feb. 9, 2017

(30) Foreign Application Priority Data

Aug. 4, 2015 (IN) .......................... 4046/CHE/2015

(51) Int. Cl.
*G06Q 20/38* (2012.01)
*G06Q 20/34* (2012.01)

(52) U.S. Cl.
CPC ....... *G06Q 20/389* (2013.01); *G06Q 20/3563* (2013.01)

(58) Field of Classification Search
CPC ........ G06Q 10/00; G06Q 20/00; G06Q 30/00; G06Q 40/00
USPC ..................................... 705/3–44
See application file for complete search history.

(56) References Cited

U.S. PATENT DOCUMENTS

| 5,093,787 A | 3/1992 | Simmons | |
| 8,103,575 B1 * | 1/2012 | Hinkle | G06Q 20/40 235/380 |
| 8,150,746 B2 * | 4/2012 | Tandon | G06Q 20/10 705/30 |
| 8,484,102 B2 | 7/2013 | Goodbody et al. | |
| 8,560,582 B2 * | 10/2013 | Harris | G06Q 50/22 705/2 |

(Continued)

*Primary Examiner* — Frantzy Poinvil
(74) *Attorney, Agent, or Firm* — Fish & Richardson P.C.

(57) ABSTRACT

Methods, systems, and apparatus, including computer programs encoded on a computer storage medium, for reconciliation data. The methods include actions of determining to perform a reconciliation task between transactions of a primary type and transactions of a secondary type, determining a reconciliation profile associated with the reconciliation task, obtaining reconciliation rules associated with the reconciliation profile from a reconciliation rule database, obtaining primary records of the primary type and secondary records of the secondary type based on the reconciliation profile, identifying matching transactions in the primary records and the secondary records and identifying unmatched transactions in the primary records and secondary records based on the reconciliation rules, providing an indication of the matched transactions and the unmatched transactions, receiving input specifying a match between an unmatched primary record transaction and an unmatched secondary record transaction, and identifying the unmatched primary record transaction and the unmatched secondary record transaction as matching.

20 Claims, 6 Drawing Sheets

(56) References Cited

U.S. PATENT DOCUMENTS

| | | | | |
|---|---|---|---|---|
| 8,676,339 B1* | 3/2014 | Olsen | ............ | A61N 1/403 |
| | | | | 607/101 |
| 8,768,803 B2* | 7/2014 | DeWanz | ............ | G06Q 10/06 |
| | | | | 705/35 |
| 2002/0062279 A1* | 5/2002 | Behrenbrinker | ....... | G06Q 20/04 |
| | | | | 705/39 |
| 2003/0074288 A1 | 4/2003 | Quine | | |
| 2005/0222929 A1* | 10/2005 | Steier | ............ | G06Q 40/00 |
| | | | | 705/35 |
| 2009/0216666 A1* | 8/2009 | Antao | ............ | G06Q 10/10 |
| | | | | 705/30 |
| 2010/0280948 A1* | 11/2010 | Cohen | ............ | G06Q 20/10 |
| | | | | 705/42 |
| 2011/0208623 A1* | 8/2011 | Tandon | ............ | G06Q 20/10 |
| | | | | 705/30 |
| 2012/0109812 A1* | 5/2012 | Hinkle | ............ | G06Q 20/40 |
| | | | | 705/37 |
| 2012/0116933 A1 | 5/2012 | Matthews et al. | | |
| 2012/0265655 A1* | 10/2012 | Stroh | ............ | G06Q 40/00 |
| | | | | 705/30 |

* cited by examiner

| General Settings | Data | History | Upload | | |
|---|---|---|---|---|---|
| 430 ⊙ 436 ⊗ View All 434 | | | | | |
| 440 Match Unmatch | | | | | |
| Variance : I Tolerance : 0.00 442 | | | | | |
| General Ledger | | | | | |
| Opening Balance : 0.00 I Closing Balance : 10000.00 | | | | | |

| | REFID 450 | GL DATE 452 | DOCUMENT NUMBER 454 | DESCRIPTION 456 |
|---|---|---|---|---|
| ⊗ | | 10/1/2014 12:00:00 AM | 213456 | DAILY BANKING for 08-01 |
| ⊗ | | 10/7/2014 12:00:00 AM | 213460 | DAILY BANKING for 08-04 |
| ⊗ | | 10/24/2014 12:00:00 AM | 213466 | DAILY BANKING for 08-04 |
| ⊙ | REF96 | 10/2/2014 12:00:00 AM | 213457 | PAYTM1 |
| ⊙ | REF108 | 10/3/2014 12:00:00 AM | 213458 | PAYTM2 |
| ⊙ | REF107 | 10/6/2014 12:00:00 AM | 213459 | PAYTM3 |
| ⊙ | REF107 | 10/13/2014 12:00:00 AM | 213461 | PAYTM4 |
| ⊙ | REF107 | 10/14/2014 12:00:00 AM | 213462 | PAYTM5 |
| ⊙ | REF107 | 10/17/2014 12:00:00 AM | 213463 | PAYTM6 |

◁ ▷ 1 2 ▲ ▽ Page size: 10 ▽

Auto And Manual Matching Report

Select Month : Oct ▼   Select Year : 2014 ▼
Select CheckList : CHN001 Monthly Reconc ▼

|◀ ▼| 1 |of 1| ▲ ▶ ▶| ◇ | 100% ▼ |   | Find | Next | 🖫 ▶ | ⊙ | 🖨 |

Match And Unmatch History Report

| Region Name | Business Units Name | Reconciliation Type | Account | Total Transaction | System Matched | System Unmatched |
|---|---|---|---|---|---|---|
| APAC | CHN001 | Accruals | 72005000 | 4 | 0 | 0 |
|  |  | Asset Accounts | 72005000 | 8 | 4 | 0 |
|  | IND001 | Bank | 60000026 | 28 | 0 | 28 |
|  |  |  | 64000001 | 21 | 4 | 0 |
|  |  | Accounts Payable | 64000002 | 23 | 0 | 0 |
|  | IND002 |  | 72000000 | 3 | 1 | 0 |
|  |  | Accounts | 72000000 | 0 | 0 | 0 |
|  |  |  | 61000042 | 7 | 0 | 0 |

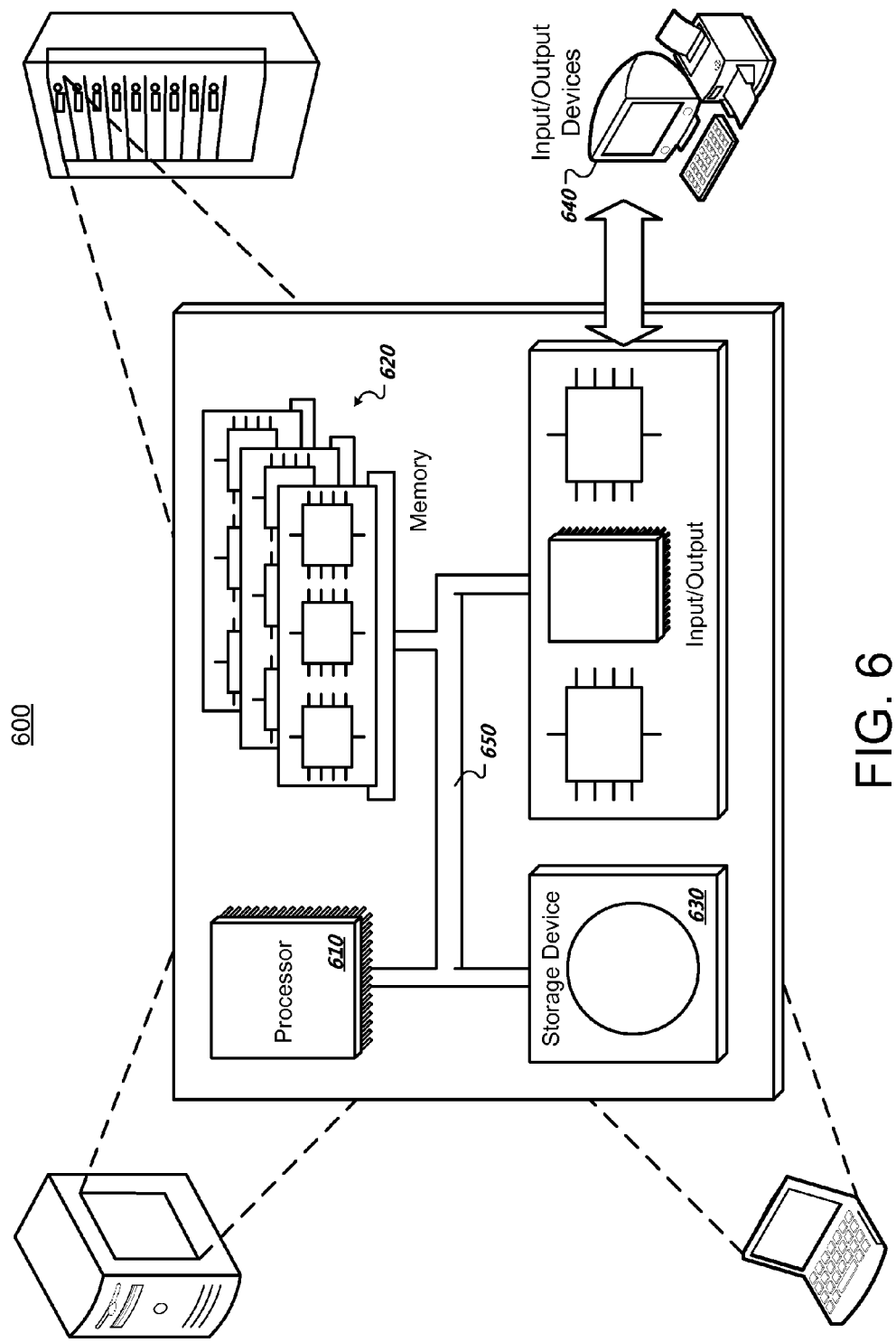

DATA RECONCILIATION

CROSS-REFERENCE TO RELATED APPLICATIONS

The present application claims the benefit of Indian Patent Application No. 4046/CHE/2015, filed on Aug. 4, 2015, which is incorporated herein by reference in its entirety for all purposes.

TECHNICAL FIELD

This disclosure generally relates to reconciling data.

BACKGROUND

Reconciliation of data is performed to ensure that two sets of data are in agreement. For example, an individual may ensure that every transaction in manually tracked expenses matches with a transaction in the individual's credit card statement, and that no transaction in an individual's credit card statement is unmatched.

SUMMARY

In general, an aspect of the subject matter described in this specification may involve a process for reconciling records. The operations include determining, by a reconciliation system, to perform a reconciliation task between transactions of a primary type and transactions of a secondary type, in response to determining to perform a reconciliation task between transactions of a primary type and transactions of a secondary type, determining a reconciliation profile associated with the reconciliation task, obtaining reconciliation rules associated with the reconciliation profile from a reconciliation rule database, where the reconciliation rule database stores multiple sets of reconciliation rules associated with different reconciliation profiles, obtaining primary records of the primary type and secondary records of the secondary type based on the reconciliation profile associated with the reconciliation task, identifying, by the reconciliation system, matching transactions in the primary records and the secondary records based on the reconciliation rules associated with the reconciliation profile, identifying, by the reconciliation system, unmatched transactions in the primary records and secondary records based on the reconciliation rules associated with the reconciliation profile, providing an indication of the matched transactions and the unmatched transactions, receiving input specifying a match between an unmatched primary record transaction and an unmatched secondary record transaction, in response to the input, identifying the unmatched primary record transaction and the unmatched secondary record transaction as matching, and providing a report based on the matching transactions and the unmatched transactions.

In another aspect, a method may include one or more of the operations described above. In yet another aspect, a computer-readable storage medium may be operable to cause a processor to perform one or more of the operations described above.

Implementations may include one or more of the following features. For example, determining, by a reconciliation system, to perform a reconciliation task between transactions of a primary type and transactions of a secondary type may include determining that timing criteria specified by a reconciliation task has been satisfied and in response to determining that the timing criteria specified by the reconciliation task has been satisfied, determining to perform the reconciliation task.

In some aspects, obtaining reconciliation rules associated with the reconciliation profile from a reconciliation rule database includes determining reconciliation rules specified by the reconciliation profile and obtaining the reconciliation rules specified by the reconciliation profile from the reconciliation rule database.

In certain aspects, identifying, by the reconciliation system, matching transactions in the primary records and the secondary records based on the reconciliation rules includes determining that matching criteria specified by a particular reconciliation rule is satisfied by a particular transaction of the primary record and a particular transaction of the secondary record.

In some implementations, determining that matching criteria specified by a particular reconciliation rule is satisfied by a particular transaction of the primary record and a particular transaction of the secondary record includes determining that a date, amount, and description of the particular transaction of the primary record are the same as a date, amount, and description of the particular transaction of the secondary record.

In some aspects, identifying, by the reconciliation system, matching transactions in the primary records and the secondary records based on the reconciliation rules includes determining that matching criteria specified by a particular reconciliation rule is satisfied by a particular transaction of the primary record and multiple transactions of the secondary record.

In certain aspects, identifying, by the reconciliation system, matching transactions in the primary records and the secondary records based on the reconciliation rules includes determining that matching criteria specified by a particular reconciliation rule is satisfied by multiple transactions of the primary record and a particular transaction of the secondary record.

In some implementations, identifying, by the reconciliation system, unmatched transactions in the primary records and secondary records based on the reconciliation rules includes determining that no matching criteria of any reconciliation rule is satisfied by a particular transaction of the primary record and any unmatched transaction of the secondary record.

In some aspects, providing an indication of the matched transactions and the unmatched transactions includes providing a graphical user interface indicating the transactions of the primary records and whether each transaction of the primary records is matched.

In certain aspects, providing an indication of the matched transactions and the unmatched transactions includes providing a recommendation of a potential match between the unmatched primary record transaction and the unmatched secondary record transaction.

In some implementations, receiving input specifying a match between an unmatched primary record transaction and an unmatched secondary record transaction includes receiving from a preparer device, an indication of user input selecting that the unmatched primary record transaction be matched with the unmatched secondary record transaction.

In some aspects, receiving from a preparer device, an indication of user input selecting that the unmatched primary record transaction be matched with the unmatched secondary record transaction includes receiving an indication of an acceptance of a recommendation of a potential match between the unmatched primary record transaction and the unmatched secondary record transaction.

In certain aspects, identifying the unmatched primary record transaction and the unmatched secondary record transaction as matching includes determining that a variance between the unmatched primary record transaction and the unmatched secondary record transaction satisfy a tolerance.

In some implementations, actions include receiving a selection of the unmatched primary record transaction and in response to receiving the selection of the unmatched primary record transaction, providing for display a variance of the unmatched secondary record transaction.

In some aspects, obtaining primary records of the primary type and secondary records of the secondary type based on the reconciliation profile associated with the reconciliation task includes obtaining an image based file from an enterprise resource planning system of a client through an interface using access information specified by the reconciliation profile, obtaining text from the image based file based on optical character recognition, and generating the primary records of the primary type of secondary records of the secondary type based on the obtained text.

In certain aspects, actions include receiving a request to modify one or more reconciliation rules associated with the reconciliation profile and modifying the one or more reconciliation rules associated with the reconciliation profile.

In some implementations, actions include receiving a request to modify associations of the reconciliation profile with one or more reconciliation rules and modifying the associations of the reconciliation profile with the one or more reconciliation rules.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

FIGS. 4 and 5 are example interfaces for reconciling records.

FIG. 6 illustrates a schematic diagram of an exemplary generic computer system.

Like reference symbols in the various drawings indicate like elements.

DETAILED DESCRIPTION

Figure 1:
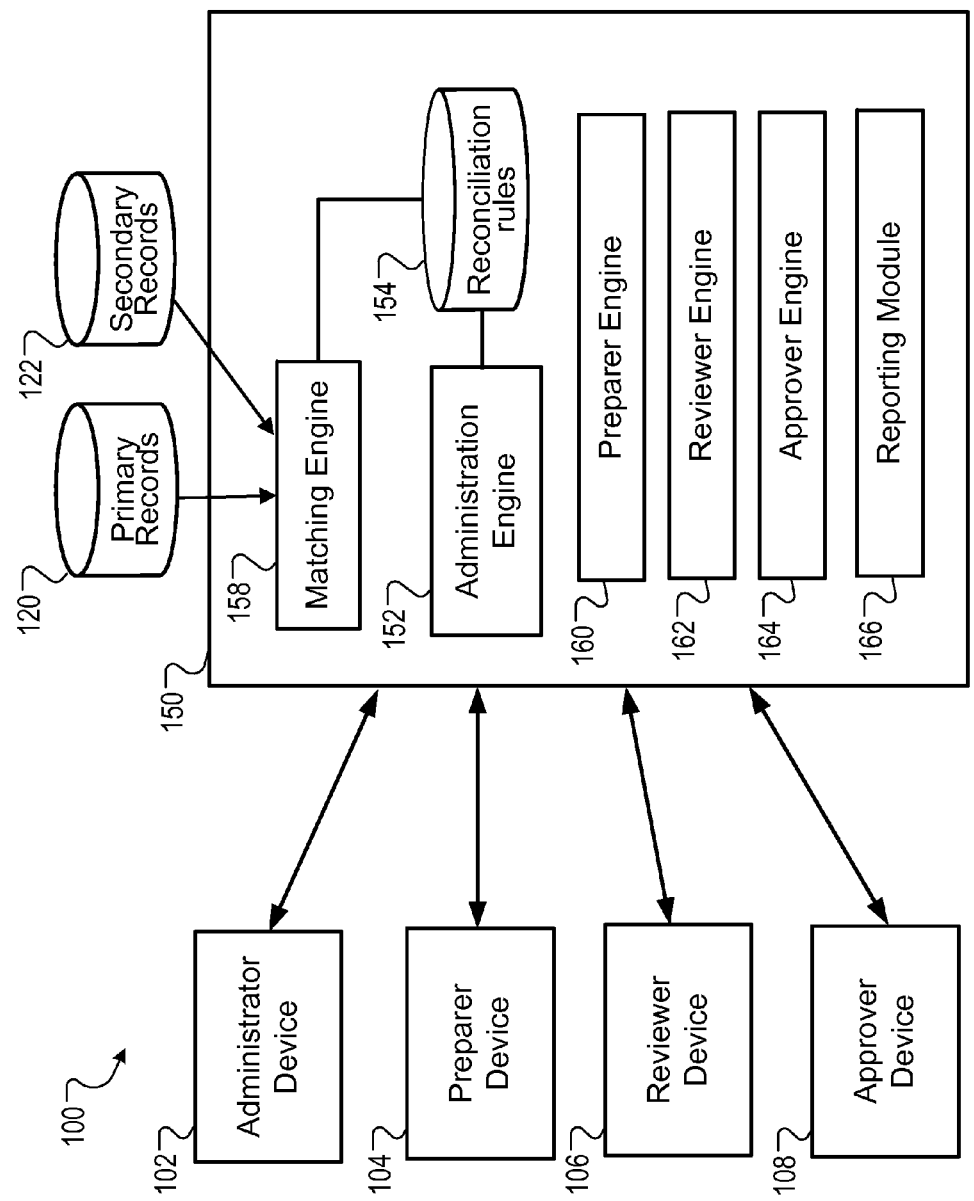
FIG. 1 is a block diagram of an example system for reconciling records.

FIG. 1 is a block diagram of an example system 100. The system 100 may automate reconciliation of transactions in a first set of records with transactions in a second set of records. Briefly, and as described in further detail below, the system 100 may include an administrator device 102, a preparer device 104, a reviewer device 106, an approver device 108, a primary record source 120, a secondary record source 122, and a reconciliation server 150.

The administrator device 102 may be a computing device used by an administrator to manage the system 100. For example, the administrator device 102 may be a desktop computer, a laptop computer, or a mobile computing device through which an administrator manages client accounts. The administrator device 102 may manage client accounts by interacting with the reconciliation server 150. For example, the administrator device 102 may access the reconciliation server 150 using a web application.

The administrator device 102 may enable the administrator to create or modify client accounts. For example, the administrator device 102 may provide a graphical user interface (GUI) in a web application, where the GUI includes fields for an administrator to enter one or more of a client name, region, category, or business unit. The client name may be a textual name of the client, the region may be a geographical region, e.g., Asia, Europe, North America, in which the client operates, the category of account, e.g., reconciliation account. In another example, the administrator device 102 may enable an administrator to manually upload a template file that defines one or more of a region, category, or business unit for the client.

The administrator device 102 may enable the administrator to create or modify one or more reconciliation profiles for types of reconciliations for each client account. For example, the administrator device 102 may provide a GUI that includes fields for an administrator to specify a first type of record and a second type of record for a particular reconciliation profile.

The administrator device 102 may enable the administrator to create or modify, and assign reconciliation rules for the reconciliation profiles. For example, the administrator device 102 may provide a GUI that includes fields for an administrator to create or modify one or more reconciliation rules specifying when particular transactions of a first type of record match particular transactions of a second type of record. The reconciliation profile may specify information for a particular type of reconciliation. For example, a first reconciliation profile may specify how bank statement transactions are reconciled with general ledger transactions, and a second reconciliation profile may specify how payroll records are reconciled with general ledger transactions.

In particular examples, reconciliation rules may include reconciliation rules for reconciling a general ledger with cash, bank, or treasury account records. The reconciliation rules may include determining that transactions match if (i) a date for a general ledger transaction is the same as date for a cash, bank, or treasury transaction, (ii) a description for the general ledger transaction is the same as a description for the transaction of the cash, bank, or treasury account transaction, (iii) a debit amount for the general ledger transaction is the same as a credit amount for the cash, bank, or treasury account transaction, and (iv) a credit amount for the general ledger transaction is the same as a debit amount for the cash, bank, or treasury account transaction.

Another reconciliation rule may include determining that transactions match if (i) a date of a general ledger transaction is the same as date of a cash, bank, or treasury account transaction, (ii) a document number of the general ledger transaction is the same as a document number of the cash, bank, or treasury account transaction, (iii) a debit amount for the general ledger transaction is the same as a credit amount for the cash, bank, or treasury account transaction, and (iv) a credit amount for the general ledger transaction is the same as a debit amount for the cash, bank, or treasury transaction.

Yet another reconciliation rule may include determining that transactions match if (i) a date of a general ledger transaction is not the same as a date of a cash, bank, or treasury account transaction, (ii) a description of the general ledger transaction is the same as a description of the cash, bank, or treasury account transaction, (iii) a debit amount for the general ledger transaction is the same as a credit amount for the cash, bank, or treasury account transaction, and (iv)

a credit amount for the general ledger transaction is the same as a debit amount for the cash, bank, or treasury transaction.

Other reconciliation rules may include, determining a match if (i) an ending balance of a general ledger is the same as an ending balance of a secondary ledger, (ii) a date and amount of a general ledger is the same as a date and amount of a secondary ledger, (iii) an ending balance for a fixed asset group is the same as a net book value of a fixed asset register, (iv) a description in a general ledger for a prior month is the same as a description of accrued current liabilities or accruals record for a current month, a credit amount in the general ledger is the same as the debit amount in the accrued current liabilities or accruals record, and a debit amount in the general ledger is the same as the credit amount in the accrued current liabilities or accruals record, (v) an accounts payable invoice in a first record is the same as an accounts receivable in a second record, or (vi) a settlement amount is the same as a payment amount.

In some implementations, the reconciliation rules may be one to one, one to many, or many to one. For example, the reconciliation rule may specify how one transaction in a primary record may match with two transactions in a secondary record if the amounts of the two transactions in the secondary record add up to the amount of the transaction in the primary record and all the transactions share the same date and description. In another, the reconciliation rule may specify how two transactions in a primary record may match with one transaction in a secondary record if the amounts of the two transactions in the primary records add up to the amount of the transaction in the secondary records and all the transactions share the same date and description.

The administrator device 102 may enable the administrator to define reconciliation tasks. For example, the administrator device 102 may provide a GUI that includes fields for an administrator to define a reconciliation task of performing a reconciliation at the end of every quarter according to a particular reconciliation profile. A reconciliation task may be a reconciliation performed according to a particular reconciliation profile.

The preparer device 104 may be a computing device used by a preparer to prepare a reconciliation task for review. For example, the preparer device 104 may be a desktop computer, a laptop computer, or a mobile computing device through which a preparer manually matches transactions that are not automatically matched and provides comments regarding the unmatched transactions. The preparer device 104 may interact with the reconciliation server 150 to prepare a reconciliation task for review. For example, the preparer device 104 may access the reconciliation server 150 using a web application.

The preparer device 104 may receive a notification that an automated matching process for a reconciliation task has been performed and provide the notification to the preparer. For example, the preparer device 104 may display an alert to a user indicating that a reconciliation task is ready for preparing by the preparer.

In response, the preparer may access an account of the preparer through a web application and view the results of the automated matching process. For example, the preparer device 104 may display a GUI for a preparer to provide log-in credentials, and after verifying the preparer's log-in credentials correspond to an account of the preparer, display matched transactions and unmatched transactions for a reconciliation task.

The preparer device 104 may enable the preparer to manually match transactions. For example, the preparer device 104 may provide a GUI that indicates transactions that are unmatched, includes a control that enables the preparer to select an unmatched transaction, and includes a control that enables the preparer to select another transaction to indicate as matching the unmatched transaction.

The preparer device 104 may enable the preparer to provide comments for unmatched comments. For example, the preparer device 104 may provide a GUI that indicates transactions that are unmatched, includes a control that enables the preparer to select an unmatched transaction, and includes a field for the preparer to enter a comment for the unmatched transaction.

The preparer device 104 may enable the preparer indicate that a reconciliation task is ready for review by a reviewer. For example, the preparer device 104 may provide a GUI with a control that a preparer may interact with to indicate that the reconciliation task is ready for review.

The reviewer device 106 may be a computing device used by a reviewer to review a reconciliation task. For example, the reviewer device 106 may be a desktop computer, a laptop computer, or a mobile computing device through which a reviewer reviews a reconciliation task. The reviewer device 106 may interact with the reconciliation server 150 to enable a reviewer to review a reconciliation task. For example, the reviewer device 106 may access the reconciliation server 150 using a web application.

The reviewer device 106 may receive a notification that a reconciliation task is ready for review. For example, the reviewer device 106 may display an alert to a reviewer indicating that a reconciliation task is ready for review by the reviewer.

In response, the reviewer may access an account of the reviewer through a web application and review the reconciliation task. For example, the reviewer device 106 may display a GUI for a reviewer to provide log-in credentials, and after verifying the reviewer's log-in credentials correspond to an account of the reviewer, display information for a reconciliation task. The reviewer device 106 may enable the reviewer to review a reconciliation task. For example, the reviewer device 106 may provide a GUI that displays matched transactions and unmatched transactions. The reviewer device 106 may enable the reviewer to indicate that a reconciliation task is ready for approval or is rejected for approval. For example, the reviewer device 106 may provide a GUI with a control that a reviewer may select to indicate that the reconciliation task is ready for approval and a control that a review may select to indicate that the reconciliation task is rejected for approval. The GUI may additionally include fields for the reviewer to enter comments as to why the reconciliation task is rejected for approval or ready for approval.

The approver device 108 may be a computing device used by an approver to approve a reconciliation task. For example, the approver device 108 may be a desktop computer, a laptop computer, or a mobile computing device through which an approver approves a reconciliation task. The approver device 108 may interact with the reconciliation server 150 to enable a reviewer to review a reconciliation task. For example, the approver device 108 may access the reconciliation server 150 using a web application.

The approver device 108 may receive a notification that a reconciliation task is ready for review. For example, the approver device 108 may display an alert to an approver indicating that a reconciliation task is ready for approval by the approver.

In response, the approver may access an account of the approver through a web application and approve the reconciliation task. For example, the approver device 108 may display a GUI for an approver to provide log-in credentials, and after verifying the approver's log-in credentials correspond to an account of the approver, display information for a reconciliation task. The approver device 108 may enable the approver to approve a reconciliation task. For example, the approver device 108 may provide a GUI that displays matched transactions and unmatched transactions. The approver device 108 may enable the approver to indicate that a reconciliation task is approved or is not approved. For example, the approval device 108 may provide a GUI with a control that an approver may select to indicate that the reconciliation task is approved and a control that an approver may select to indicate that the reconciliation task is not approved. The GUI may additionally include fields for the approver to enter comments as to why the reconciliation task is rejected or approved.

The primary record source 120 and secondary record source 122 may be sources of records. For example, the primary record source 120 and/or the secondary record source 122 may be a database, a spreadsheet file, a server of another entity, or another source of records of transactions. The primary record source 120 may include records of a first type and the secondary record source 122 may include records of a second type. For example, the primary record source 120 may be a general ledger of a company and the secondary record source 122 may be a server of a bank that provides a record of financial transactions recorded by the bank for a company. The records may include records for cash, bank, intercompany, general ledger, payroll, liability accounts, tax accounts, accruals, accounts receivable, accounts payable, cash management and disbursements, assets accounts, inventory, assets clearing account, royalty, treasury accounts, accrued current liabilities, deferred revenue, value added tax.

The reconciliation server 150 may be one or more computing devices that interact with the administrator device 102, the preparer device 104, the reviewer device 106, and the approver device 108 for reconciling records. The reconciliation server 150 may be physically remote for the administrator device 102, the preparer device 104, the reviewer device 106, and the approver device 108, and may be accessed through web applications over the Internet or an internal network.

The reconciliation server 150 may include an administration engine 152, a reconciliation rule database 154, a matching engine 158, a preparer engine 160, a reviewer engine 162, an approver engine 164, and a reporting module 166. The administration engine 152 may interact with the administrator device 102 to enable an administrator to manage the system 100.

The administration engine 152 may interact with the administrator device 102 to enable administrators to create or modify client accounts. For example, the administration engine 152 may provide a web page that is rendered on the administration device 102 through which administrators may enter information to create or modify client accounts. The administration engine 152 may receive information from the administration engine 152 and generate client accounts based on the information. For example, the administration engine 152 may receive a client name, an indication of a geographical region, an indication of a category, and an indication of a business unit for the client, and in response, generate a client account storing the information.

The administration engine 152 may enable the administrators to create or modify one or more reconciliation profiles for types of reconciliations for the client. For example, the administration engine 152 may provide a web page that is rendered on the administration device 102 through which administrators may enter information to create or modify one or more reconciliation profiles. The administration engine 152 may determine reconciliation profiles that may be applicable for the client based on the client profile. For example, the administration engine 152 may determine the geographical region and category stored in the client profile, and in response, determine a subset of pre-defined reconciliation profiles that may be of interest to clients in the geographical region and category, and provide the administration device 102 a web page that indicates that the subset of reconciliation profiles may be of interest to the client.

The administration engine 152 may receive information from the administrator device 102 and generate the reconciliation profiles for the client. For example, the administration engine 152 may receive information from the administrator device 102 that indicates that two pre-defined reconciliation profiles that are recommended by the administration engine 152 based on the client profile should be created for the client profile, and information from the administrator device 102 that indicates that a third reconciliation profile should be created for reconciling cash records with a general ledger, and then generate the three reconciliation profiles for the client profile.

In some implementations, the information from the administration device 102 entered by the administrator may include information identifying the primary record source 120 and the secondary record source 122. For example, the administrator may specify a directory and file name of the primary record source 120 and a directory and file name of the secondary record source 122. In another example, the administrator may specify a data source in a database and credentials for accessing the data source.

The administration engine 152 may enable the administrator to create or modify, and assign reconciliation rules for the reconciliation profiles. For example, the administration engine 152 may provide a web page that is rendered on the administration device 102 through which administrators may enter information to create and assign reconciliation rules for the reconciliation profiles.

The administration engine 152 may determine reconciliation rules that may be applicable for the reconciliation profile based on the reconciliation profile. For example, the administration engine 152 may determine that the reconciliation profile is for reconciling bank account statements and a general ledger, and in response, determine a subset of pre-defined reconciliation rules that are applicable for reconciling bank account statements and general ledgers, and provide the administration device 102 a web page that indicates that the subset of reconciliation rules may be applicable for the reconciliation profile.

The administration engine 152 may receive information from the administrator device 102 and generate the reconciliation rules for the reconciliation profiles. For example, the administration engine 152 may receive information from the administrator device 102 that indicates that a reconciliation profile should use four reconciliation rules recommended by the administration engine 152 based on the reconciliation profile, and two reconciliation rules custom defined by the administrator through the web page provided by the administration engine 152. The administration engine 152 may then generate and store the reconciliation rules in the reconciliation rules database 154.

The administration engine 152 may enable the administrators to define reconciliation tasks specifying when reconciliations should be performed. For example, the administration engine 152 may provide a web page that is rendered on the administration device 102 through which administrators may define a reconciliation task of performing a reconciliation at the end of every quarter according to a particular reconciliation profile. Other intervals may include daily, weekly, monthly, semi-yearly, or yearly reconciliations. The administration engine 152 may receive information from the administrator device 102 and generate the reconciliation tasks for the client profile. For example, the administration engine 152 may receive information from the administrator device 102 that indicates that a reconciliation task should be performed using a particular reconciliation profile every month for a client profile and in response generate the reconciliation task.

The administration engine 152 may determine when reconciliations tasks should be initiated based on the reconciliation tasks. For example, the administration engine 152 may determine that it is the end of the month and in response, determine whether any of the reconciliation tasks are specified as being automatically initiated at the end of the month. In response to determining one or more reconciliation tasks are specified as being automatically initiated at the end of the month, the administration engine 152 may initiate the reconciliation task. In some implementations, the administration engine 152 may additionally or alternatively receive requests from the administrator device 102 to initiate a reconciliation using a particular reconciliation profile in response to an administrator manually requesting through a GUI that a reconciliation be performed using a particular reconciliation profile.

In response to an initiation of a reconciliation task according to a reconciliation profile, the matching engine 158 may automatically access the primary record source 120 and the secondary record source 122 indicated by the reconciliation profile. For example, the matching engine may obtain a general ledger as a primary record source 120 from a directory specified by the reconciliation profile and obtain a bank account statement as a secondary record source 122 from a bank's server using credentials specified in the reconciliation profile. In some implementations, the matching engine 158 may perform optical character recognition (OCR) to read an image, a portable document format (PDF) file, or some other image-based data to determine transaction records. For example, the matching engine 158 may receive images of a bank statement and perform OCR to extract transactions in the bank statement. In some implementations, the matching engine 158 may use text searching or natural language processing to determine information for transaction records. For example, the matching engine 158 may extract dates, amounts, and descriptions for transactions from a document using text searching or natural language processing.

The matching engine 158 may obtain a set of reconciliation rules for the reconciliation task based on the particular reconciliation profile. For example, the matching engine 158 may determine that the reconciliation task is to be performed using a reconciliation task for reconciling a general ledger with a bank account statement, and in response, the matching engine 158 may obtain multiple reconciliation rules that each specify criteria for determining when a transaction in a general ledger matches a transaction in a bank account statement. The matching engine 158 may obtain the set of reconciliation rules from the rules database 154. For example, the matching engine 158 may provide the reconciliation rules database 154 a request for reconciliation rules associated with the reconciliation profile for reconciling a general ledger with a bank account statement, and in response, receive the associated reconciliation rules.

The matching engine 158 may use the reconciliation rules to determine matches between the primary records and secondary records. For example, the matching engine 158 may determine that a particular transaction of the primary record matches a particular transaction of the secondary record according to a particular reconciliation rule. The matching engine 158 may determine matches by sequentially applying the reconciliation rules. For example, the reconciliation rules may be ordered by priority and the matching engine 158 may first apply the highest priority reconciliation rule, determine the matches between transactions in a general ledger with transactions in a bank account statement, store information in association with those transactions indicating the match between the transactions, obtain the second highest priority reconciliation rule, determine the matches between the remaining unmatched transactions, store information in association with those previously unmatched transactions now determined to match, and continue for the remaining reconciliation rules.

In another example, the matching engine 158 may first consider a transaction in the general ledger, apply a highest priority reconciliation rule and determine if there is a matching transaction in the bank account statement, if no match, apply the second highest priority reconciliation rule and continue applying rules until either a match is determined or no reconciliation rules are not considered for that transaction, and then repeat the process for another transaction in the general ledger until all transactions in the general ledger are considered.

The priority of the reconciliation rules may be pre-defined or specified by the administrator using the administrator device 102. In some implementations, the reconciliation rules have no priority and may be applied in any order. For example, the reconciliation rules may be applied in a random order or in order by creation. In some implementations, the matching engine 158 may apply reconciliation rules to already matched transactions and information may be stored in association with transactions showing that two transactions were matched according to multiple reconciliation rules. In some implementations, the matching engine 158 may specify when there is an ambiguous match. For example, the matching engine 158 may determine that two transactions of a primary record may match either of two transactions in a secondary record, and in response, leave the four transactions as unmatched and store information indicating the ambiguous match between the four transactions.

The matching engine 158 may provide a notification to the preparer engine 160 after the matching process is completed. For example, the matching engine 158 may provide the primary records, secondary records, and the stored information indicating matches to the preparer engine 160.

The preparer engine 160 may enable the preparer to prepare a reconciliation task for review. The preparer engine 160 may receive primary records, secondary records, and stored information indicating matches from the matching engine 158. For example, the preparer engine 160 may receive two thousand transactions in primary records and two thousand transactions in secondary records, and information indicating matches between one thousand nine hundred transactions of the primary records and one thousand nine hundred transactions of the secondary records and no matches between one hundred transactions of the primary records and one hundred transactions of the secondary records.

In response to receiving the primary records, secondary records, and stored information indicating matches, the preparer engine 160 may provide a notification to preparer device 104 that a reconciliation task is ready for preparation. For example, the preparer engine 160 may transmit an e-mail to a preparer received on the preparer device 104.

The preparer engine 160 may receive a request from the preparer device 104 to prepare the reconciliation task. For example, the preparer engine 160 may receive log-in credentials of the preparer from the preparer device 104 and an indication that the preparer wishes to prepare the particular reconciliation task.

In response to receiving the request to prepare a reconciliation task, the preparer engine 160 may provide an indication of the matched records and unmatched records. For example, the preparer engine 160 may provide a GUI listing the various primary records, secondary records, and matches between the transactions of the primary records and the transactions of the secondary records. In some implementations, the preparer engine 160 may provide a web application in which transactions may be filtered based on whether the transactions are matched or unmatched. For example, the preparer engine 160 may provide a GUI in which a control may be provided for a preparer to indicate that the preparer would like to only see unmatched transactions. In some implementations, the GUI may indicate one or more of the number of transactions from the primary record that are unmatched, the number of transactions from the secondary record that are unmatched, the amount of value for the transactions from the primary record that are unmatched, or the amount of value for the transactions from the secondary record that are unmatched.

The preparer engine 160 may enable preparers to manually indicate matches between transactions. For example, the preparer engine 160 may provide a GUI rendered on the preparer device 104 that enables a preparer to select an unmatched transaction of a primary record and a control that a preparer may select to indicate a match with another unmatched transaction of a secondary record. In some implementations, the preparer engine 160 may instead provide a GUI that sequentially displays unmatched transactions to the preparer, enables the preparer to select another unmatched transaction, and includes a control for the preparer to select to indicate a match between the displayed unmatched transaction and the selected unmatched transaction. In response to receiving input specifying a manual match between one or more primary records and one or more secondary records, the preparer engine 160 may update the match information to indicate that those records are manually matched.

In some implementations, the preparer engine 160 may allow manual matches to be entered only when an amount of the primary record to be matched is the same as the amount of the secondary record to be matched, or within a tolerance. For example, the preparer engine 160 may enable a control for indicating a match when a primary record for an amount of one thousand and a secondary record for an amount of one thousand are both selected, but disable a control for indicating a match when a primary record for an amount of one thousand and a secondary record for an amount of two thousand are both selected. In some implementations, the preparer engine 160 may obtain a tolerance from a client profile or reconciliation profile. For example, the client profile may include a tolerance of $5 that was previously specified by an administrator through the administration engine 152 and enable a control for indicating a match to be selected when a difference between amounts of selected transactions is within $5.

In some implementations, the preparer engine 160 may enable preparers to unmatch automatically matched or manually matched transactions. For example, the preparer engine 160 may provide a GUI in which the preparer may select a matched transaction and select a control indicating that the transaction should be unmatched, and in response to receiving a selection of the control, store information indicating that the automatically matched transaction is unmatched.

In some implementations, the preparer engine 160 may provide recommendations of potential matches to preparers. For example, the preparer engine 160 may determine potential matches from information from the matching engine 158 indicating an ambiguous match between four records, display in a GUI the four records for the ambiguous match and an explanation for why the match is ambiguous, e.g., each transaction may match two possible other corresponding transaction, and display controls for enabling the preparer to select which of the two corresponding transactions a transaction should match.

In another example, the preparer engine 160 may provide recommendations based on portions of reconciliation rules satisfied. For example, for a particular unmatched transaction, the preparer engine 160 may indicate a strong recommendation that three out of four criteria for a particular reconciliation rule were satisfied by a corresponding unmatched transaction, and indicate a moderate recommendation that two out of three criteria for another reconciliation rule were satisfied by another corresponding unmatched transaction.

In some implementations, when a transaction of the primary record or a transaction of the secondary record is selected for matching, the preparer engine 160 may display in the GUI a variance of corresponding transactions from the amount of the selected record and a tolerance permitted. For example, the preparer engine 160 receives a selection of an unmatched transaction of a primary record for $1000, the preparer engine 160 may update the unmatched transactions of the secondary records to show the difference in amount from $1000 and high those unmatched transactions with a difference amount less than a tolerance of $5. In some implementations, the preparer engine 160 may recommend potential matches based on ordering the unmatched corresponding transactions from least to greatest variance.

The preparer engine 160 may enable preparers to provide comments. For example, the preparer engine 160 may provide a GUI with fields in which the preparer may enter comments regarding a particular transaction. In a particular example, the comments may indicate why the preparer manually matched the transactions or why the preparer left a transaction unmatched.

The preparer engine 160 may enable preparers to indicate that a reconciliation task is ready for review by a reviewer. For example, the preparer engine 160 may provide a GUI with a control that a preparer may select to indicate that a reconciliation task is ready for review. In response to receiving an indication that a reconciliation task is ready for review, the preparer engine 160 may provide a notification to the reviewer engine 170.

In enabling users to indicate that a reconciliation task is ready for review, the preparer engine 160 may determine whether the reconciliation task satisfied review criteria. For example, the preparer engine 160 may not enable the control to select that the reconciliation task is ready for review until the reconciliation task satisfies the review criteria. The review criteria may include one or more of that the number of unmatched transactions of a primary source is below a predetermined number, the number of unmatched transactions of a secondary source is below a predetermined number, the percentage of unmatched transactions of a primary source is below a predetermined percentage, percentage of unmatched transactions of a secondary source is below a predetermined percentage, the variance of the matched transactions is below a predetermined amount or amount based on a percentage of the total amount of the transactions, all the unmatched transactions are associated with a comment entered by the preparer, or other criteria.

The reviewer engine 162 may enable a reviewer to review a reconciliation task. The reviewer engine 162 may receive a notification from the preparer engine 160 that a reconciliation task is review for review. For example, the reviewer engine 162 may receive the primary records, secondary records, and information indicating matches between the primary records and secondary records.

In response to receiving the notification that the reconciliation task is ready for review, the reviewer engine 162 may provide a notification to the reviewer device 106 that a reconciliation task is ready for review. For example, the reviewer engine 162 may transmit an e-mail to a reviewer received on the reviewer device 106.

The reviewer engine 162 may receive a request from the reviewer device 106 to review the reconciliation task. For example, the reviewer engine 162 may receive log-in credentials of the reviewer from the reviewer device 106 and an indication that the reviewer wishes to review the particular reconciliation task.

In response to receiving the request to review a reconciliation task, the reviewer engine 162 may provide an indication of the matched records and unmatched records. For example, the reviewer engine 162 may provide a GUI listing the various primary records, secondary records, and matches between the primary records and secondary records. The reviewer engine 162 may receive an indication that the reviewer rejects the reconciliation task or accepts the reconciliation task. For example, the reviewer engine 162 may receive an indication that the reviewer selected a control that indicates that the reconciliation task is ready for approval or selected a control that indicates that the reconciliation task is rejected for approval. The reviewer engine 162 may further receive comments from the reviewer device 106. For example, the reviewer engine 162 may provide a GUI in which a reviewer may enter a comment for the reconciliation task in rejecting the reconciliation task.

In response to determining that an indication rejecting the reconciliation task for approval was received, the reviewer engine 162 may provide a notification to the preparer engine 160 that the reconciliation task was rejected for approval and any comments that the reviewer entered. For example, the reviewer engine 162 may provide a notification to the preparer engine 160 that a reconciliation task was rejected along with comment that there are too many unmatched transactions. The preparer engine 160 may then notify the preparer to re-prepare the reconciliation task for review.

In response to determining that an indication that the reconciliation task is ready for review was received, the reviewer engine 162 may provide a notification to the approver engine 164 that the reconciliation task is ready for approval. For example, the approver engine 164 may receive the primary records, secondary records, and information indicating matches between the primary records and secondary records.

In response to receiving the notification that the reconciliation task is ready for approval, the approver engine 164 may provide a notification to the approver device 108 that a reconciliation task is ready for review. For example, the approver engine 164 may transmit an e-mail to an approver received on the approver device 108.

The approver engine 164 may receive a request from the approver device 108 to approve the reconciliation task. For example, the approver engine 164 may receive log-in credentials of the approver from the approver device 108 and an indication that the approver wishes to approve the particular reconciliation task.

In response to receiving the request to approve a reconciliation task, the approver engine 164 may provide an indication of the matched transactions and unmatched transactions. For example, the approve engine 164 may provide a GUI listing the various primary records, secondary records, and matches between the primary records and secondary records. The approver engine 164 may receive an indication that the approver rejects the reconciliation task or approves the reconciliation task. For example, the approver engine 164 may receive an indication that the approver selected a control that indicates that the reconciliation task is approved or selected a control that indicates that the reconciliation task is rejected. The approver engine 164 may further receive comments from the approver device 108. For example, the approver engine 164 may provide a GUI in which an approver may enter a comment for the reconciliation task in rejecting the reconciliation task.

In response to determining that an indication rejecting the reconciliation task was received, the approver engine 164 may provide a notification to the reviewer engine 162 and preparer engine 160 that the reconciliation task was rejected and any comments that the approver entered. For example, the approver engine 164 may provide a notification to the reviewer engine 162 that a reconciliation task was rejected along with a comment that there are too many unmatched transactions. The reviewer engine 162 may then notify the reviewer to re-review the reconciliation task and preparer engine 160 may then notify the preparer to re-prepare the reconciliation task The reporting module 166 may generate reports regarding reconciliation tasks. For example, the reporting module may generate a potential exposure report, a potential exposure summary report, an aging report, a reconciliation status report, or an auto and manual match report. In some implementations, the reporting module 166 may limit access to particular reports to particular type of users. For example, an administrator may be able to view all reports, but the preparer, reviewer, and approver may only have access to the aging report, reconciliation status report, and auto and manual match report.

A potential exposure report may include a measure of risk for all of the unmatched transactions. The reporting module 166 may calculate the measure by evaluating existing open transaction counts and values against their potential age during the lifetime of transactions. The reporting module 166 may calculate the measure of risk based on the transaction count and value of transactions categorized as unidentified compared to transactions categorized as identified, timing difference, and how old or aged the transactions have been. For example, a transaction which is unidentified and aged for 60+ days may carry a higher risk weightage. Identified transactions may be unmatched transactions which will be matched off in the coming months, e.g., accrued liabilities or prepaid expenses. Transactions categorized as timing difference may be due to entries being missed out due to transmission or process delays, e.g. a check deposit accounted in general ledger on the last day of the month may only reflect in the bank statement in the following month when the check has been cleared and actual proceeds credited to the bank account. The potential exposure report may be based on month and year. For example, the reporting module 166 may receive a selection of a month and year and generate a potential exposure report for that month and year. The potential exposure report may include total debit and credit values with variance, unmatched transactions with categories distinguished as unidentified, identified, and timing difference and an aging period ranging from zero to one hundred plus days.

The potential exposure summary report may summarize the potential exposure for the past three months with the same details as in a potential exposure report. The aging report may indicate the aging for an unmatched transaction. Current aging for all transactions may be based on a general ledger date or a sub ledger date. The report may be viewed by selected month and year. The report may be specific to region. The reconciliation status report may be for a region for a particular month of the year. The report may include the following and indicate the status of reconciliation by end of every month, country, business unit, account number and description, stage, status, reviewer and approver name, task start and end date, etc. The auto and manual match report may provide a count of transactions that are system matched, system unmatched, manual matched and the percentage of the total transactions that fall under each category.

Different configurations of the system 100 may be used where functionality of the administrator device 102, preparer device 104, reviewer device 106, approver device 108, primary record source 120, secondary record source 122, the reconciliation server 150, the administration engine 152, the reconciliation rule database 154, the matching engine 158, the preparer engine 160, the reviewer engine 162, the approver engine 164, and the reporting module 166 may be combined, further separated, distributed, or interchanged. The system 100 may be implemented in a single device or distributed across multiple devices.

Figure 2:
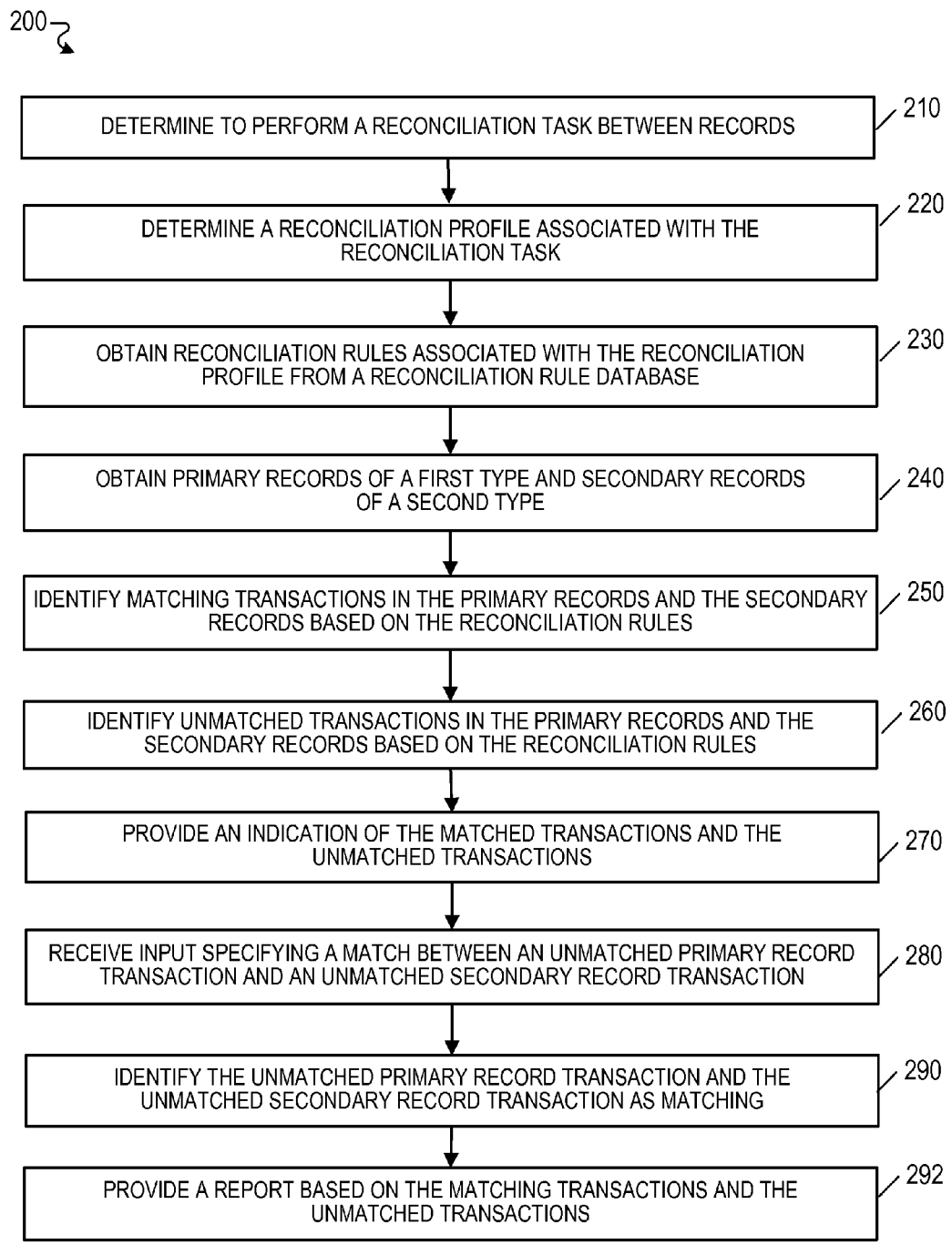
FIGS. 2 and 3 are flowcharts of example processes for reconciling records.

FIG. 2 is a flowchart of an example process 200 for reconciling records. The following describes the process 200 as being performed by components of the system 100 that are described with reference to FIG. 1. However, the process 200 may be performed by other systems or system configurations.

The process 200 includes determining to perform a reconciliation task between records (210). For example, the administration engine 152 may determine that the end of the month has arrived and that a reconciliation task has been scheduled to occur at the end of the month, and in response, determine to perform the reconciliation task.

The process 200 includes determining a reconciliation profile associated with the reconciliation task (220). For example, the administration engine 152 may determine that the reconciliation task specifies a reconciliation be performed according to a particular reconciliation profile for reconciling general ledger records and bank account statements.

The process 200 includes obtaining reconciliation rules associated with the reconciliation profile from a reconciliation rule database (230). For example, the administration engine 152 may determine that the reconciliation profile determined to be associated with a reconciliation task specifies one or more reconciliation rules for reconciling general ledger records and bank account statements.

The process 200 includes obtaining primary records of a first type and secondary records of a second type (240). For example, the matching engine 158 may determine that the reconciliation profile specifies that the matching engine 158 obtain general ledger records from a particular network directory that stores general ledger records and obtain bank statement records from a bank server, and in response, may obtain the general ledger records by accessing the particular network directory and the bank server.

The process 200 includes identifying matching transactions in the primary records and the secondary records based on the reconciliation rules (250). For example, the matching engine 158 may determine that a transaction in the primary records matches a transaction in the secondary records based on determining that a reconciliation rule, that specifies that if a date, amount, and description of the transactions are the same then the transactions match, is satisfied.

The process 200 includes identifying unmatched transactions in the primary records and the secondary records based on the reconciliation rules (260). For example, the matching engine 158 may determine transactions of the primary records and the secondary records that are not determined by the matching engine 158 to match according to any of the reconciliation rules. In another example, the matching engine 158 may determine transactions of the primary records and the secondary records that do not to match according to particular reconciliation rules that specify when transactions do not match.

The process 200 includes providing an indication of the matched transactions and the unmatched transactions (270). For example, the preparer engine 160 may generate a GUI showing each of the transactions of the records along with an indication whether each of the transactions is matched, where the GUI is provided by the preparer engine 160 through a web application to be displayed on the preparer device 104 in a web browser executed on the preparer device 104.

The process 200 includes receiving input specifying a match between an unmatched primary record transaction and an unmatched secondary record transaction (280). For example, the preparer device 104 may receive input through a GUI from the user selecting an unmatched primary record transaction, selecting an unmatched secondary record transaction, and selecting a control indicating that the selected unmatched primary record transaction and unmatched secondary record transaction match, and provide information indicating the selections to the preparer engine 160.

The process 200 includes in response to the input, identifying the unmatched primary record transaction and the unmatched secondary record transaction as matching (290). For example, the preparer engine 160 may store information indicating the unmatched primary record transaction and the unmatched secondary record transaction are matched with each other.

The process 200 includes providing a report based on the matching transactions and the unmatched transactions (292). For example, the reporting module 166 may receive a request from the preparer device 104 sent in response to a user requesting a report through a GUI displayed on the preparer device 104, and in response, the reporting module 166 may generate a report that indicates the matching transaction and the unmatched transactions based on the match information.

Figure 3:
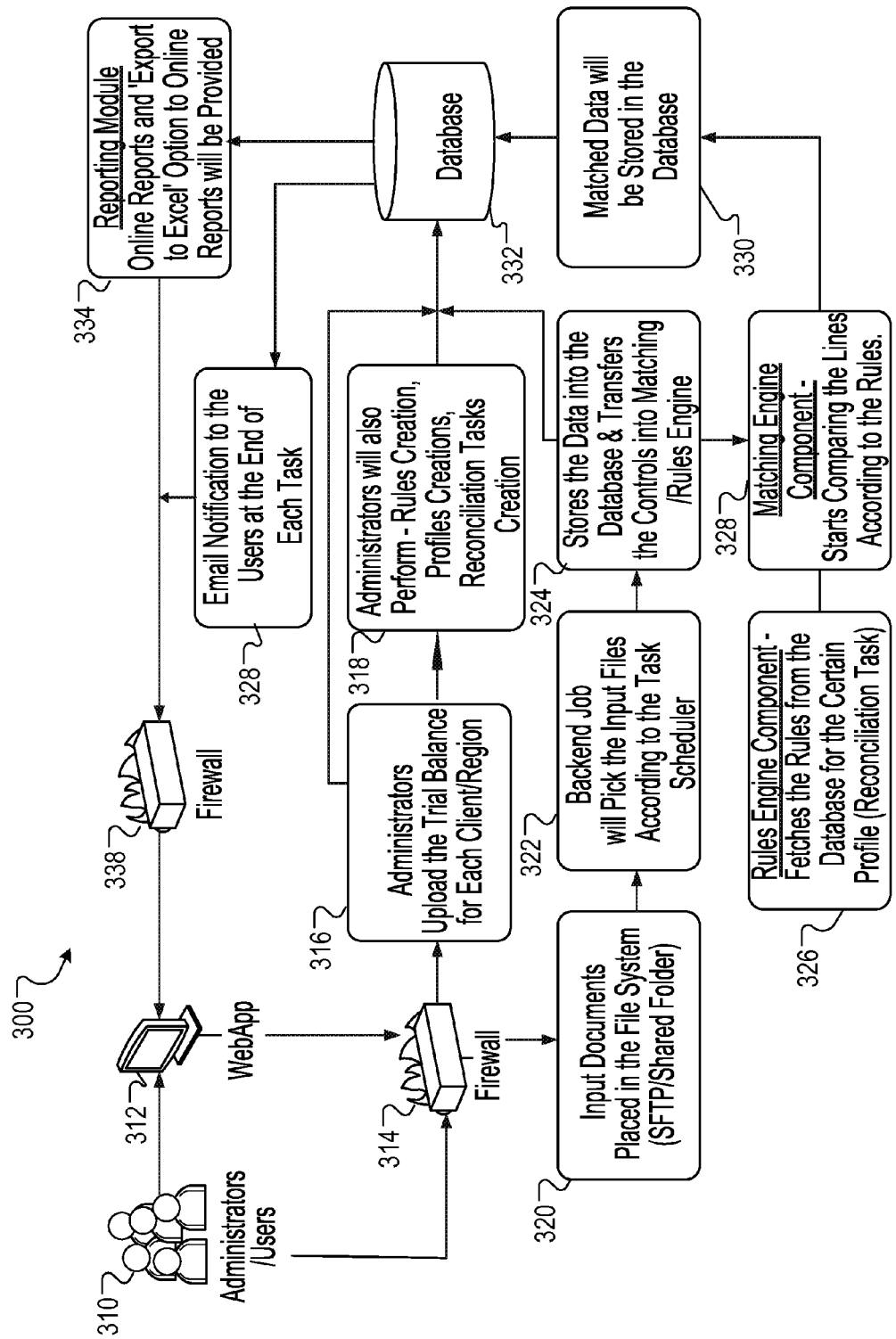

FIG. 3 is a diagram of an example process 300 for reconciling transactions. The following describes the process 300 as being performed by components of the system 100 that are described with reference to FIG. 1. However, the process 300 may be performed by other systems or system configurations. Administrators 310 access the reconciliation server 150 using an administrator device 102 through a web application 312. The web application 312 passes information through a firewall 314 that may provide for security. The administrations upload a trial balance, e.g., a general ledger, for each client and region (316). The administrators create or modify rules, profiles, and tasks using the administrator device 102 (318). The administrators 310 use the administrator device 102 to place input documents in a file system, e.g., using SSH File Transfer Protocol or a shared folder (320). The administration engine 152 obtains the input documents when the administration engine 152 determines that a reconciliation task should be performed (322). The administration engine 152 stores the data into a database 332 and transfers control to the matching engine 158 (324). A rule engine of the matching engine 158 obtains the rules for a reconciliation profile from the database 332 (326). The matching engine 158 determines matches for the records based on the rules (328). The matching engine 158 stores the matched data in the database 332 (330). The reporting module generates online reports (334) and provides notifications to users that matching has been performed (336). The online reports and notifications pass through a firewall 338 and are received through the web application 312.

FIG. 4 illustrates an example graphical user interface 400 indicating matched transactions and unmatched transactions. The GUI 400 may be displayed on the administrator device 102. The GUI 400 displays transactions of a general ledger with a first portion showing unmatched transactions 410 and a second portion showing matched transactions 420. The unmatched transactions 410 are sorted to a top of the transactions and are associated with icons, e.g., non-overlapping circles, that indicate that the transactions are unmatched. The matched transactions 420 are sorted below the unmatched transactions and are associate with icons, e.g., a check box, that indicate that the transactions are matched. The GUI also includes controls for filtering the transactions. The controls include a matched control 430 that a user may select to filter to view only matched transactions, an unmatched control 430 that a user may select to view only unmatched transactions, and a dropdown control 434 that a user may select to toggle between viewing all transactions, only matched transactions, and only unmatched transactions. For each transaction, the GUI displays a match ID 450 that identifies the rule under what a match was determined when there is a match, a transaction date 452 that indicates a date of the transaction, a document number 454 that indicates a document associated with the transaction, and a description 458 that is a description for the transaction. The GUI further shows a total variance 440 and a tolerance 442 for the reconciliation profile. In some implementations, the match ID may be selectable to display information describing what criteria was considered and satisfied, and what values of the transactions were found to satisfy the criteria.

FIG. 5 illustrates an example graphical user interface 500 showing a report. The GUI 500 displays an auto and manual matching report. The auto and manual matching report includes a selection area 510 and a report area 512. The selection area 510 may include controls for a user to select different options for an auto and manual matching report. The controls may include controls for selecting a month, a year, and a checklist. Checklist may refer to a particular reconciliation profile. The report area 512 may include details of the report. The details may include a region name, a business unit name, a reconciliation type, an account, a total transaction representing a total number of transactions per account, a system matched representing a number of transactions matched according to reconciliation rules, a system unmatched representing a number of transactions that were not matched according to the reconciliation rules and not manually matched, user matched representing a number of transactions manually matched by the user, and user unmatched representing a number of transactions that were system unmatched and then manually unmatched by the user.

FIG. 6 illustrates a schematic diagram of an exemplary generic computer system. The system 600 can be used for the operations described in association with the processes 200 and 300 according to some implementations. The system 600 may be included in the system 100.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 800. In one implementation, the input/output device 640 includes a keyboard and/or pointing device. In another implementation, the input/output device 640 includes a display unit for displaying graphical user interfaces.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them. In some cases, the one or more programmable computers may be connected by a network to form a distributed computing environment (e.g., a cloud).

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claim is:

1. A computer implemented method, comprising:
    determining, by an administration engine of a reconciliation system that includes (i) the administration engine, (ii) a matching engine, (iii) a preparer engine, and (iv) a reporting engine, to perform a reconciliation task between transactions of a primary type and transactions of a secondary type;
    in response to determining to perform a reconciliation task between transactions of a primary type and transactions of a secondary type, determining, by the administration engine of the reconciliation system, a reconciliation profile associated with the reconciliation task;

obtaining, by the administration engine of the reconciliation system, reconciliation rules associated with the reconciliation profile from a reconciliation rule database, where (i) the reconciliation rule database stores multiple sets of reconciliation rules associated with different reconciliation profiles and (ii) the reconciliation rules associated with the reconciliation profile are ranked according to a priority;

obtaining, by the matching engine of the reconciliation system, primary records of the primary type and secondary records of the secondary type based on the reconciliation profile associated with the reconciliation task;

identifying, by the matching engine of the reconciliation system, a first group of matching transactions in the primary records and the secondary records based on the on a portion of the reconciliation rules associated with the reconciliation profile that have a highest ranking and not based on a remaining portion of the reconciliation rules associated with the reconciliation profile;

identifying, by the matching engine of the reconciliation system, a second group of matching transactions in the primary records and the secondary records based on both the portion of the reconciliation rules associated with the reconciliation profile and the remaining portion of the reconciliation rules associated with the reconciliation profile;

identifying, by the matching engine of the reconciliation system, unmatched transactions in the primary records and secondary records based on both the portion of the reconciliation rules associated with the reconciliation profile and the remaining portion of the reconciliation rules associated with the reconciliation profile;

providing, by the preparer engine of the reconciliation system, an indication of the matched transactions and the unmatched transactions;

receiving, by the preparer engine of the reconciliation system, input specifying a match between an unmatched primary record transaction and an unmatched secondary record transaction;

in response to the input, identifying, by the preparer engine of the reconciliation system, the unmatched primary record transaction and the unmatched secondary record transaction as matching; and providing, by the reporting engine of the reconciliation system, a report based on the matching transactions and the unmatched transactions.

2. The method of claim 1, wherein determining, by a reconciliation system, to perform a reconciliation task between transactions of a primary type and transactions of a secondary type comprises:

determining that timing criteria specified by a reconciliation task has been satisfied; and in response to determining that the timing criteria specified by the reconciliation task has been satisfied, determining to perform the reconciliation task.

3. The method of claim 1, wherein obtaining reconciliation rules associated with the reconciliation profile from a reconciliation rule database comprises:

determining reconciliation rules specified by the reconciliation profile; and obtaining the reconciliation rules specified by the reconciliation profile from the reconciliation rule database.

4. The method of claim 1, wherein identifying, by the reconciliation system, a first group of matching transactions in the primary records and the secondary records based on a portion of the reconciliation rules comprises:

determining that matching criteria specified by a particular reconciliation rule is satisfied by a particular transaction of the primary record and a particular transaction of the secondary record.

5. The method of claim 4, wherein determining that matching criteria specified by a particular reconciliation rule is satisfied by a particular transaction of the primary record and a particular transaction of the secondary record comprises:

determining that a date, amount, and description of the particular transaction of the primary record are the same as a date, amount, and description of the particular transaction of the secondary record.

6. The method of claim 1, wherein identifying, by the reconciliation system, a first group of matching transactions in the primary records and the secondary records based on a portion of the reconciliation rules comprises:

determining that matching criteria specified by a particular reconciliation rule is satisfied by a particular transaction of the primary record and multiple transactions of the secondary record.

7. The method of claim 1, wherein identifying, by the reconciliation system, a first group of matching transactions in the primary records and the secondary records based on a portion of the reconciliation rules comprises:

determining that matching criteria specified by a particular reconciliation rule is satisfied by multiple transactions of the primary record and a particular transaction of the secondary record.

8. The method of claim 1, wherein identifying, by the reconciliation system, unmatched transactions in the primary records and secondary records based on both the portion of the reconciliation rules associated with the reconciliation profile and the remaining portion of the reconciliation rules associated with the reconciliation profile comprises:

determining that no matching criteria of any reconciliation rule is satisfied by a particular transaction of the primary record and any unmatched transaction of the secondary record.

9. The method of claim 1, wherein providing an indication of the matched transactions and the unmatched transactions comprises:

providing a graphical user interface indicating the transactions of the primary records and whether each transaction of the primary records is matched.

10. The method of claim 1, wherein providing an indication of the matched transactions and the unmatched transactions comprises:

providing a recommendation of a potential match between the unmatched primary record transaction and the unmatched secondary record transaction.

11. The method of claim 1, wherein receiving input specifying a match between an unmatched primary record transaction and an unmatched secondary record transaction comprises:

receiving, from a preparer device, an indication of user input selecting that the unmatched primary record transaction be matched with the unmatched secondary record transaction.

12. The method of claim 11, wherein receiving, from a preparer device, an indication of user input selecting that the unmatched primary record transaction be matched with the unmatched secondary record transaction comprises:

receiving an indication of an acceptance of a recommendation of a potential match between the unmatched primary record transaction and the unmatched secondary record transaction.

13. The method of claim 1, identifying the unmatched primary record transaction and the unmatched secondary record transaction as matching comprises:
   determining that a variance between the unmatched primary record transaction and the unmatched secondary record transaction satisfy a tolerance.

14. The method of claim 1, comprising:
   receiving a selection of the unmatched primary record transaction; and
   in response to receiving the selection of the unmatched primary record transaction, providing for display a variance of the unmatched secondary record transaction.

15. The method of claim 1, wherein obtaining primary records of the primary type and secondary records of the secondary type based on the reconciliation profile associated with the reconciliation task comprises:
   obtaining an image based file from an enterprise resource planning system of a client through an interface using access information specified by the reconciliation profile;
   obtaining text from the image based file based on optical character recognition; and
   generating the primary records of the primary type of secondary records of the secondary type based on the obtained text.

16. The method of claim 1, comprising:
   receiving a request to modify one or more reconciliation rules associated with the reconciliation profile; and
   modifying the one or more reconciliation rules associated with the reconciliation profile.

17. The method of claim 1, comprising:
   receiving a request to modify associations of the reconciliation profile with one or more reconciliation rules; and
   modifying the associations of the reconciliation profile with the one or more reconciliation rules.

18. A system comprising:
   an administration engine configured to:
      determine to perform a reconciliation task between transactions of a primary type and transactions of a secondary type;
      in response to determining to perform a reconciliation task between transactions of a primary type and transactions of a secondary type, determine a reconciliation profile associated with the reconciliation task; and
      obtain reconciliation rules associated with the reconciliation profile from a reconciliation rule database, where the reconciliation rule database stores multiple sets of reconciliation rules associated with different reconciliation profiles and (ii) the reconciliation rules associated with the reconciliation profile are ranked according to a priority;
   a matching engine configured to:
      obtain primary records of the primary type and secondary records of the secondary type based on the reconciliation profile associated with the reconciliation task;
      identify a first group of matching transactions in the primary records and the secondary records based on a portion of the reconciliation rules associated with the reconciliation profile that have a highest ranking and not based on a remaining portion of the reconciliation rules associated with the reconciliation profile;
      identify a second group of matching transactions in the primary records and the secondary records based on both the portion of the reconciliation rules associated with the reconciliation profile and the remaining portion of the reconciliation rules associated with the reconciliation profile; and
      identify unmatched transactions in the primary records and secondary records based on both the portion of the reconciliation rules associated with the reconciliation profile and the remaining portion of the reconciliation rules associated with the reconciliation profile;
   a preparer engine configured to:
      provide an indication of the matched transactions and the unmatched transactions;
      receive input specifying a match between an unmatched primary record transaction and an unmatched secondary record transaction; and
      in response to the input, identify the unmatched primary record transaction and the unmatched secondary record transaction as matching; and
   a reporting module configured to:
      provide a report based on the matching transactions and the unmatched transactions.

19. The system of claim 18, wherein obtain reconciliation rules associated with the reconciliation profile from a reconciliation rule database comprises:
   determine reconciliation rules specified by the reconciliation profile; and
   obtain the reconciliation rules specified by the reconciliation profile from the reconciliation rule database.

20. A non-transitory computer-readable medium storing software comprising instructions executable by one or more computers which, upon such execution, cause the one or more computers to perform operations comprising:
   determining, by an administration engine of a reconciliation system that includes (i) the administration engine, (ii) a matching engine, (iii) a preparer engine, and (iv) a reporting engine, to perform a reconciliation task between transactions of a primary type and transactions of a secondary type;
   in response to determining to perform a reconciliation task between transactions of a primary type and transactions of a secondary type, determining, by the administration engine of the reconciliation system, a reconciliation profile associated with the reconciliation task;
   obtaining, by the administration engine of the reconciliation system, reconciliation rules associated with the reconciliation profile from a reconciliation rule database, where (i) the reconciliation rule database stores multiple sets of reconciliation rules associated with different reconciliation profiles and (ii) the reconciliation rules associated with the reconciliation profile are ranked according to a priority;
   obtaining, by the matching engine of the reconciliation system, primary records of the primary type and secondary records of the secondary type based on the reconciliation profile associated with the reconciliation task;
   identifying, by the matching engine of the reconciliation system, a first group of matching transactions in the primary records and the secondary records based on a portion of the reconciliation rules associated with the reconciliation profile that have a highest ranking and not based on a remaining portion of the reconciliation rules associated with the reconciliation profile;

identifying, by the matching engine of the reconciliation system, a second group of matching transactions in the primary records and the secondary records based on both the portion of the reconciliation rules associated with the reconciliation profile and the remaining portion of the reconciliation rules associated with the reconciliation profile;

identifying, by the matching engine of the reconciliation system, unmatched transactions in the primary records and secondary records based on both the portion of the reconciliation rules associated with the reconciliation profile and the remaining portion of the reconciliation rules associated with the reconciliation profile;

providing, by the preparer engine of the reconciliation system, an indication of the matched transactions and the unmatched transactions;

receiving, by the preparer engine of the reconciliation system, input specifying a match between an unmatched primary record transaction and an unmatched secondary record transaction;

in response to the input, identifying, by the preparer engine of the reconciliation system, the unmatched primary record transaction and the unmatched secondary record transaction as matching; and providing, by the reporting engine of the reconciliation system, a report based on the matching transactions and the unmatched transactions.

* * * * *

UNITED STATES PATENT AND TRADEMARK OFFICE
CERTIFICATE OF CORRECTION

PATENT NO. : 10,332,109 B2
APPLICATION NO. : 14/922487
DATED : June 25, 2019
INVENTOR(S) : Prakash Ghatage et al.

Page 1 of 1

It is certified that error appears in the above-identified patent and that said Letters Patent is hereby corrected as shown below:

In the Claims

In Claim 1, Column 21, Line 18, delete "based on the" and insert -- based --, therefor.

Signed and Sealed this
Twenty-seventh Day of August, 2019

Andrei Iancu
*Director of the United States Patent and Trademark Office*